United States Patent
Orsini

(10) Patent No.: US 11,282,149 B2
(45) Date of Patent: Mar. 22, 2022

(54) EXERGY TOKEN

(71) Applicant: LO3 Energy Inc., Brooklyn, NY (US)

(72) Inventor: Lawrence Orsini, Brooklyn, NY (US)

(73) Assignee: LO3 Energy Inc., San Francisco, CA (US)

( * ) Notice: Subject to any disclaimer, the term of this patent is extended or adjusted under 35 U.S.C. 154(b) by 0 days.

(21) Appl. No.: 16/103,247

(22) Filed: Aug. 14, 2018

(65) Prior Publication Data
US 2019/0050949 A1    Feb. 14, 2019

Related U.S. Application Data

(60) Provisional application No. 62/574,784, filed on Oct. 20, 2017, provisional application No. 62/544,990, filed on Aug. 14, 2017.

(51) Int. Cl.
*G06Q 20/40* (2012.01)
*G06Q 30/02* (2012.01)
(Continued)

(52) U.S. Cl.
CPC ............. *G06Q 50/06* (2013.01); *G05B 15/02* (2013.01); *G05B 19/042* (2013.01);
(Continued)

(58) Field of Classification Search
CPC ..... G06Q 50/00–34; G06Q 20/00–425; G05B 15/00–02; G05B 19/00–0428; G05B 2219/2639; H02J 3/381; H02J 3/00–36; H02J 13/00–0096; H02J 2203/00–20
See application file for complete search history.

(56) References Cited

U.S. PATENT DOCUMENTS 8,583,520 B1 * 11/2013 Forbes, Jr. ........ H02J 13/00028
705/34
2012/0082159 A1    4/2012 Taft et al.
(Continued)

OTHER PUBLICATIONS

Boemer et al. Status of Revision of IEEE Std 1547 and 1547.1 Inoformal report based on IEEE P1547/Draft 5.0, Aug. 2016 (Year: 2016).*

(Continued)

*Primary Examiner* — John W Hayes
*Assistant Examiner* — Chenyuh Kuo
(74) *Attorney, Agent, or Firm* — Fish & Richardson P.C.

(57) ABSTRACT

A method for the management of energy data includes methods, systems and computer program products. One of the methods includes receiving, by a self-executing contract, settlement information from at least two nodes in a network, the network comprising a plurality of nodes, each node in the plurality of nodes may maintain at least a predetermined number of tokens, each token representing a value. The method includes validating a current state of a public ledger. The method includes generating fulfillment information based on the received settlement information. The method also includes contributing to an updated state of the public ledger using the fulfillment information; wherein each token is associated with a payload describing the production, consumption, management, storage or transmission of electricity.

17 Claims, 9 Drawing Sheets

(51) Int. Cl.
  *G06Q 20/32* (2012.01)
  *G06Q 20/34* (2012.01)
  *G06Q 20/38* (2012.01)
  *G06Q 50/06* (2012.01)
  *G05B 19/042* (2006.01)
  *H02J 3/38* (2006.01)
  *H02J 3/00* (2006.01)
  *H02J 13/00* (2006.01)
  *H02J 3/32* (2006.01)
  *G05B 15/02* (2006.01)

(52) U.S. Cl.
  CPC ............ *G06Q 20/389* (2013.01); *H02J 3/008* (2013.01); *H02J 3/32* (2013.01); *H02J 3/381* (2013.01); *H02J 13/0013* (2013.01); *G05B 2219/2639* (2013.01); *H02J 13/00* (2013.01); *H02J 2203/20* (2020.01)

(56) References Cited

U.S. PATENT DOCUMENTS

| | | |
|---|---|---|
| 2016/0072287 A1* | 3/2016 | Jia .......................... G05B 15/02 |
| | | 700/295 |
| 2016/0284033 A1* | 9/2016 | Winand ................. G06Q 50/06 |
| 2016/0350734 A1 | 12/2016 | Samid et al. |
| 2017/0103468 A1 | 4/2017 | Orsini et al. |
| 2017/0155515 A1* | 6/2017 | Androulaki ............ G06Q 10/00 |
| 2017/0358041 A1 | 12/2017 | Forbes, Jr. et al. |
| 2019/0164236 A1* | 5/2019 | Mayne ................. G06Q 20/389 |

OTHER PUBLICATIONS

International Search Report and Written Opinion for App. Ser. No. PCT/US18/46750, dated Nov. 1, 2018, 7 pages.
International Preliminary Report on Patentability in International Application No. PCT/US2018/046750, dated Feb. 18, 2020, 5 pages.
Supplementary European Search Report for Appl. No. 18846766.6, dated Jan. 19, 2021, 8 pages.
European Search Report for Appl. No. 18846766.6, dated Dec. 14, 2020, 7 pages.

* cited by examiner

EXERGY TOKEN

CLAIM OF PRIORITY

This application claims priority under 35 USC § 119(e) to U.S. Patent Application Ser. No. 62/544,990, filed on Aug. 14, 2017, the entire contents of which are hereby incorporated by reference. This application also claims priority under 35 USC § 119(e) to U.S. Patent Application Ser. No. 62/574,784, filed on Oct. 20, 2017, the entire contents of which are hereby incorporated by reference.

TECHNICAL FIELD

The disclosure relates to the field of automated electrical power system and computation control systems, and more particularly, to systems, methods, and apparatus for distributed electric power system and computation system control. The disclosure relates to peer-to-peer settlement for participation in energy and computation supply and/or curtailment of supply, and for energy or computation capacity consumption or usage by elements in the distributed network.

BACKGROUND

The accelerating adoption of highly distributed renewable energy generation at the grid-edge is the direct result of several industry trends which are presently self-reinforcing. These trends collectively are creating both benefits and drawbacks for the electric distribution system as it currently exists; the benefits include the potential reduction in congestion at certain nodes within the distribution grid, possible deferral of infrastructure capital spend, reduction of carbon emissions from the electric power supply chain and the increasing resilience of microgrid formation and participation by these energy assets, while the drawbacks include increasing difficulty of maintaining distribution system voltage and frequency within desired control limits as more intermittent grid-edge generation is absorbed, as well as disruption to legacy utility business models through higher efficiency and increasing load defection.

SUMMARY

In general, one innovative aspect of the subject matter described in this specification can be embodied in methods that include the act of receiving, by a self-executing contract, settlement information from at least two nodes in a network, the network comprising a plurality of nodes, each node in the plurality of nodes maintains at least a predetermined number of tokens, each token representing a value. The methods include the act of validating a current state of a public ledger. The methods include the act of generating fulfillment information based on the received settlement information. The methods also include the act of contributing to an updated state of the public ledger using the fulfillment information; wherein each token is associated with data describing the production, consumption, management and transmission of electricity.

In general, another innovative aspect of the subject matter described in the specification includes tokens and systems for the cryptographically-secure, automatic or autonomous control of devices comprising, connected to or remotely operating devices in an electrically powered network and the transaction of the benefits, costs or value created by or transacted through the devices in this electrically powered network.

Particular embodiments of the subject matter described in this specification can be implemented to realize one or more of the following advantages. Data associated with the production, consumption, management and transmission of electricity may be monetized. A global platform for standardizing the acquisition of and permissioned access to the above data may be established. Permissions to 3rd parties energy data via a blockchain based marketplace and native token system may be purchased. A set of digital assets may be creating by encrypting data about the production, consumption, storage, management, and transmission of electricity. The digital assets may be managed and stored in a secure, blockchain based distributed fashion. Data may be categorized/tagged with regard to 'filter-able' classifiers, such that unique subsets are accessible via customized requests. Data about the transmission of electricity may be collecting, transmitting, and utilizing above data on a future basis for use in marketplace operation and participation. The assignment and utilization of key pairs may be used to encrypt and decrypt above data for the purpose of permissioning/restricting access. Digital tokens may be used as a component of permissioning marketplace participation for the data. The combination of a pricing mechanism, and data availability search function and set of access keys within a web portal can be used to facilitate the acquisition and monetization of the data.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Electric power system assets can be viewed as nodes within a network that, when properly connected and incentivized, deliver key value elements (or "network utility"), which include ultra-efficient energy production and consumption, autonomous grid-edge control, rapid restoration, and a wide array of societal benefits. This translates into high levels of specific value streams at the grid edge that ideally should be framed into a bilateral exchange of that value (we refer to this as transactive energy). These values streams currently cannot be tapped because of structural barriers to that simple exchange.

The major challenges in transitioning to this type of energy ecosystem are ensuring that energy access, resiliency, security, decarbonization, increased grid utilization and democratization are achieved at the lowest cost and without negatively impacting current grid reliability.

One approach utilizes a blockchain-based token system to reduce barriers and facilitate the optimal coupling of local electric generation with parties that can evaluate, generate, store, trade, and utilize this generation most efficiently. This is squarely a customer-centric model—where customers (who may increasingly be operating within a microgrid) own and operate the DER assets. This supports a growing distributed energy ecosystem that best serves its own load demands in normal use, while coincidentally opening up direct and derivative service value streams to utilities and distribution system operators (DSO). This more traditional utility enterprise can both utilize the microgrid for its broader system balancing needs and provide energy transport services to link adjacent microgrids as it evolves its business model.

The services facilitated through "tokenization" of energy attributes can be packaged for exchange within a transactive energy market. Beside the basic physical commodity energy transfer here are broader societal values for attributes that major consumer sets and their government agencies consider high priority in the advancement of renewable energy. This includes energy availability (capacity) as an aspect of resiliency, energy flexibility (dispatchability) for accommodating increasingly diverse load balancing needs, and source generation source provenance (sustainability).

Figure 1:
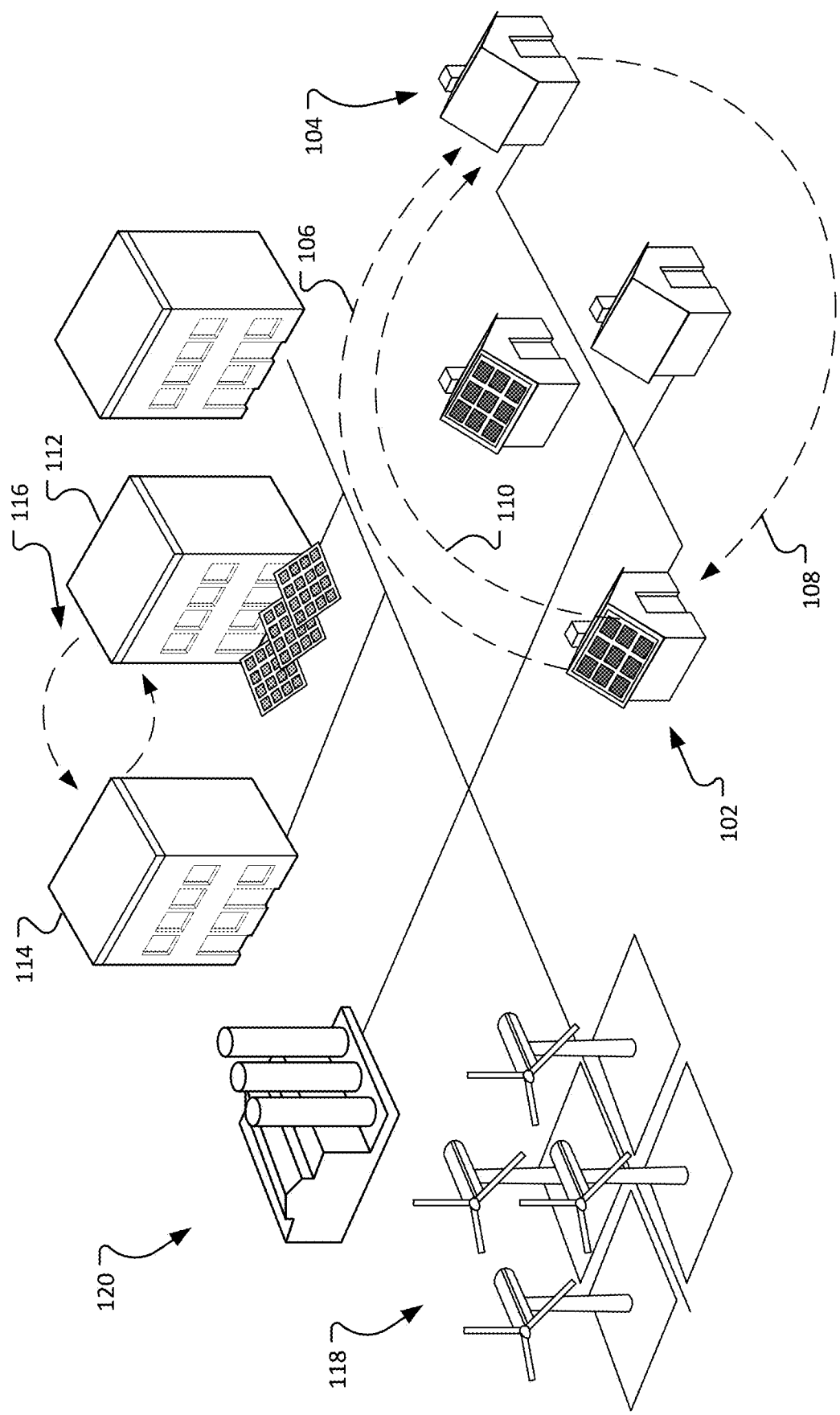
FIG. 1 illustrates an energy system value chain.

In energy systems, exergy is the high-quality output available to be used/translated into work. Academic studies based on the US economy show that the production-to-consumption energy conversion process is 86 percent inefficient, and there is a similar story the world over. FIG. 1 below illustrates the trend in overall US energy efficiency as viewed through the energy flow from all fuel sources, conversions, and transmissions, through to end consumption. Studies show that there has been a stagnation in exergy levels in recent years.

By increasing exergy—improving the efficiency of energy systems and utilization—and decreasing heat waste, our economies become more productive. But today, economists focus more on measuring energy, not exergy, missing opportunities for creating a more robust economy.

Transactive energy is an opportunity to incentivize values other than just simple kwh; the purpose of the Exergy project is to continue to link market actions and outcomes at the level of economic activity that is most effective for avoiding the combustion or delivery losses that drag down economic productivity.

The accelerating adoption of distributed renewable energy generation at the grid edge is the direct result of several self-reinforcing industry trends. These trends collectively are creating both benefits and drawbacks for the electric distribution system as it currently exists. Major benefits include reduced carbon emissions from the electric power supply chain, increased resiliency in microgrids, potential reduction in congestion at certain nodes, and possible deferral of infrastructure capital spend. Some drawbacks include difficulty in maintaining voltage and frequency within desired control limits as more grid-edge generation is absorbed back into the grid, as well as a disruption to the legacy utility business model, as efficiency improves and more energy is produced and consumed at a local, microgrid level.

Some of the Trends Include:

Trend 1.

Distributed energy resources (DER), including solar PV panel systems and the corresponding power conversion electronics and energy storage components, continue dropping in price, lowering affordability barriers and allowing more consumers to participate. The vast and increasing amount of these independently owned and operated grid edge assets can be harnessed through transactive energy methods.

Trend 2.

Consumer choice is failing consumers. In the markets where consumers have choice in their energy supply, they are being offered renewables at a premium, when in fact the design of the grid makes it difficult to decarbonize even as new renewable generation is added. Consumers increasingly expect to be able to scrutinize and verify their choices and act out their values through consumption. Transactive energy provides a way to better capture key attributes such as provenance or 'greenness' and pass those on as service offers.

Trend 3.

Interconnection standards are becoming more widely adopted, enabling easier plug and play grid connection of DER, which lowers cost and timeline barriers for distribution system interconnection. Microgrid technology is also rapidly advancing the development and wider adoption of standardized systems that can interoperate at the grid edge.

Trend 4.

Rapid advances within the Internet of Things (IoT) domain, coupled with increasing availability of low cost communication network bandwidth are permitting intelligent monitoring and control capabilities at the edge of the grid. This added precision applies to both generation and load management. This in turn results in improved capabilities for intelligent aggregation, automation, and monetizing an aggregate response through grid services.

Trend 5.

Regulatory imperative: Already 195 countries have agreed to aggressive greenhouse gas emissions abatement measures through the Paris Agreement on climate change. Some states and many cities have 100% renewable energy objectives already codified. In parallel, the focus in many countries is to move toward power sector deregulation, designed to encourage more competition (which advances innovation), by separating the functions of generation, transmission, distribution and retail supply into different business processes and corporate entities. The movement toward low carbon and more "new market entrants" in the energy sector is already in motion, but the rate of these changes taking place may still vary.

Trend 6.

Computing and network processing power continues to advance at roughly the rate of Moore's Law with the advent of 10 nm process semiconductors running at lower power levels and faster clock speeds, and the 5G wireless standard that can soon dramatically reduce latencies and raise bandwidth in the telecom network. Artificial intelligence and other computing advances open up further opportunities for transactive energy.

Trend 7.

Aggressive maturation of the sharing economy, which by its nature drives economic value to the most direct and efficient solution, often utilizes peer-to-peer connection. Blockchain, as a transaction foundation, also enables these highly-decentralized models to thrive. This is a critical aspect of meeting the growing demand for consumer choice (Trend 2).

Electricity generators face competitive market forces as legacy grid-center technologies such as coal fired and nuclear powered steam turbine generation become uneconomic, due to both higher overhead and operating costs (as compared with natural gas fired units) as well as the efficiency loss and vulnerability points from transmitting electric power over long distances through multiple transformers to the ultimate consumer. On top of that, the cost of utility-scale renewable energy with wind and solar plants is reaching parity with gas fired generation, and continuing to drop. That affects other system components as well, lowering adoption barriers for smaller DER facilities at the grid edge.

Distribution system operators (legacy electric utilities) are facing much higher levels of system instability caused by the intermittency of this injected renewable energy. Adding to the instability is the decrease in system inertia resulting from the reduction of spinning generation, and the replacement of highly inertial traditional load with the more "instant on/off" digital power electronics. These largely regulated monopoly grid operators also find that their state regulators are under increasing pressure to reform their policies, and to authorize rate structures that accommodate higher market participation of customer-owned DER as part of the solution.

FIG. 1 illustrates an energy system value chain. Energy can be generated from large energy producing plants, such as a fossil fuel burning plant 120 or a windfarm 118. The energy can then be distributed for use by energy consumers. In some situations, and energy consumer may also be an energy producer. For example, the home 102 includes solar cells which produce an amount of energy in excess of the needs of the home 102. The home 102 notifies an energy consuming home 104 that it has an amount of energy available for a particular period of time and is offering it for a particular price (as represented by the arrow 106). The energy consuming home 104 accepts the offer and arranges for payment (as represented by the arrow 108). The home 102 sends the energy to the energy consuming home 104 (as represented by the arrow 110).

The realities of the exchange may be a little more complex, as the energy provided by the home 102 may be placed on the electrical energy grid. In the energy consumed by the energy consuming home 104 may be pulled off of the electrical energy grid. Therefore, it is generally not the same energy produced by the energy producing home 102 that is consumed by the energy consuming home 104, but instead, the energy used by the energy consuming home 104 is offset by the "green" energy produced by the home 102.

Other similar arrangements may be occurring in other parts of the system, for example a business 112 may provide access energy to another business 114. While the diagram shows exchanges from home to home and business-to-business, the system may also include exchanges between homes and businesses and businesses and homes.

The system described herein addresses a system to track, manage, and commoditize these grid edge power sources. Individual transactions that are processed under the transactive energy paradigm may be viewed as compensated commodity products and grid service provision, or viewed more basically as an efficient balancing and clearing of rights and obligations for the underlying services. In our context of the energy markets, these typically fall under the following value domains, where purchases can be made in either spot (for immediate delivery) or futures markets. Transactive energy value domains include the following, in order of likely maturity for commercial development application:

| Order | Transactive Energy Value Domain | Primary Time Domains |
|---|---|---|
| 1st | Energy Purchase (consumptive or persistent) | TD3, TD4 |
| 2nd | Grid Management Services (Capacity, Real Power, Reactive Power, Freq. Regulation) | TD1, TD2 |
| 3rd | Energy Consumption and Demand Data | TD2-TD4 |

Beyond existing wholesale markets, these value domains cannot easily be accessed by third party service providers, particularly at distribution network or local levels. The Exergy blockchain and token system overcomes this by creating a digital mechanism to access and synthesize the critical attributes from the transactive energy value domains, while establishing and maintaining a network participation authorization.

A system can use the creation of a digital mechanism that may be instantiated and subsequently managed using a blockchain ledger system. The digital mechanism is designed to synthesize the critical attributes from the Transactive Energy Value Domains, while establishing and maintaining a network participation authorization. As used herein, this entity is called the Central Token and specifically name it the Exergy Token.

There are many Use Cases that LO3 Energy can undertake to create industry solutions that can be implemented which require capturing specific attributes of the energy generation, storage, transmission or load consumption that occur around a transaction. These attributes can be very dynamic (and variable) and require a series of key data capture events and time stamp alignment for proper transaction clearing. The data can be captured in secondary digital assets/object/entities. We call these entities Token(s).

| Component Token | Type | Purpose |
|---|---|---|
| Exergy Token | Central | The token "shell" is the blockchain that is manufactured with the ICO to create the full population of transaction envelopes that can function as the transactive exchange medium within the Exergy Utility Network. These tokens may be used to execute trades by the industry as an open standard blockchain platform. |
| Anergy Token(s) | Edge | LO3 proprietary component. The event-specific value content that is compiled dynamically to represent the attributes presented by the local energy system configuration at the time. Because some Use Cases may require "supplemental data capture" there may be some buffering based on specific needs. Over time, some transactions can be processed within this edge blockchain. |

A token system can be used to:
Provide an unambiguous identification of the unique physical event that occurs with the creation, transmission, storage, or consumption of energy
Incorporate a representation of the ownership right to the energy services associated with these events
Ensure authenticity, validate formation, and facilitate privacy and security of transactions
Allow for differentiation of generation type, location and other important characteristics.

The Exergy Token system provides the means to facilitate value exchange transactions that grow in complexity from the First, Second, and ultimately through the Third transactive energy value domains identified above. Since the system works without a central repository or single administrator, the token system represents a means to achieve fully decentralized operation with peer-to-peer trading partners at the core of an expanding ecosystem that can gradually augment classic utility distribution system services as their business models evolve toward full DSP/DSO providers, or provide transactive capability in off grid situations where no alternatives exist.

As noted, the Exergy Token system is used to facilitate transactions for a series of "energy services" that fall within multiple value domains—ranging from basic peer-to-peer local energy sales to connected microgrid reliability services. The value is created not only by generation and supply of energy, or demand for energy, but the time scale at which the energy supply and demand are made available. Depending on the specific service type, the formation and validation of the token may be impacted by the time domain governing the practical application of blockchain for these services.

The Exergy Token system is designed to operate over the same physical parameters as the grid and at the speed needed for local settlement. The system incentivizes the permission to operate within the local instance (such as a microgrid) of an application, and organizes the devices to provide the right data and communications for transactions, and finally facilitates the settlement to the secure, immutable blockchain.

Figure 2:
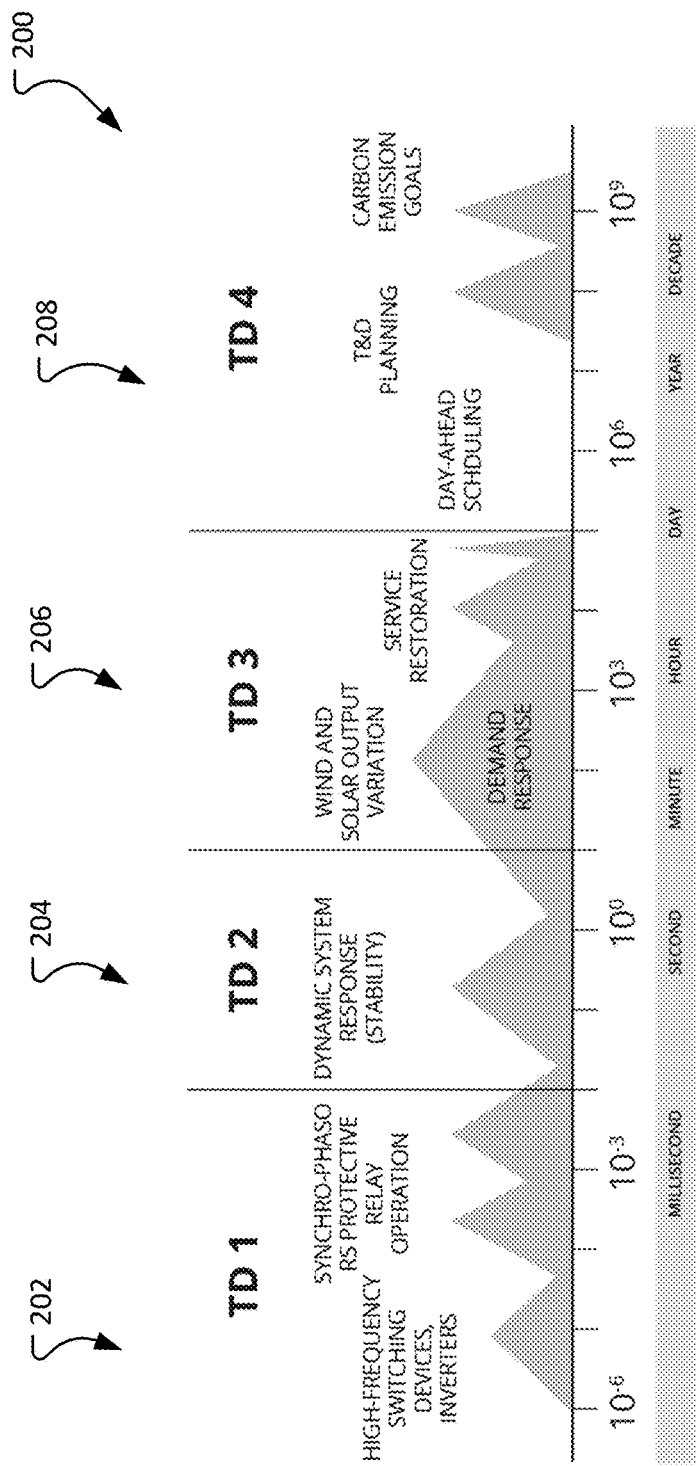
FIG. 2 is a chart that illustrates the different time domains.

The timing and latencies of the transactive message sequence play a critical role in determining which Use Cases can best be executed through a blockchain based solution. FIG. 2.1 illustrates the approximate regions that are currently viable (using known communications network technology) for appropriate implementation based on the underlying grid services that are required in the specific Use Case.

FIG. 2 is a chart 200 that illustrates the different time domains. The TD1 202 indicate grid frequency monitoring that occurs in thousandths of a second (millisecond). Currently this data is stored and used for later off-line state analysis, or for device self-management, although the early use of this for real time control in systems is beginning to appear. The application of global, public blockchain for this quadrant is highly unlikely due to the extreme latency and overhead issues.

Moving to the TD2 204, where single or multiple seconds frame the duration, this begins to include the faster grid services that are utilized for control and balance of the electric distribution system. The application of blockchain within this time domain is challenging due to the latency and overhead issues, but this may be overcome through selective buffering and data compression.

Moving right to the TD3 206, where minutes or hours encompass the service duration, the application of the EXERGY TOKEN SYSTEM. to transaction of these services is ideal. This is squarely the domain of the Energy services, although some of the longer duration grid services such as Demand Response or Black Start grid service restoration could be supported through a blockchain based solution.

Moving to the TD4 208 time quadrant, these time domains encompass multiple days and reflect larger energy asset investment decisions. The solution could lend itself to transactive energy for forward market hedging and derivative products as well.

For those applications where the time domain is appropriate, blockchain is well suited to energy transactions at the grid edge which are too expensive for a central authority to settle at scale, and to allow for simple services such as where peers transact directly (where appropriate) to help mitigate utility overhead costs. It provides the ability to secure the information that is shared between participants and verify or settle transactions autonomously.

The Exergy blockchain is designed to operate over the same physical parameters as the grid and at the speed needed for local settlement. The Exergy Token system incentivizes the permission to operate within the local instance (such as a microgrid) of an application, and the devices to provide the right data and communications for transactions, and finally the settlement to the secure, immutable blockchain.

Figure 3:
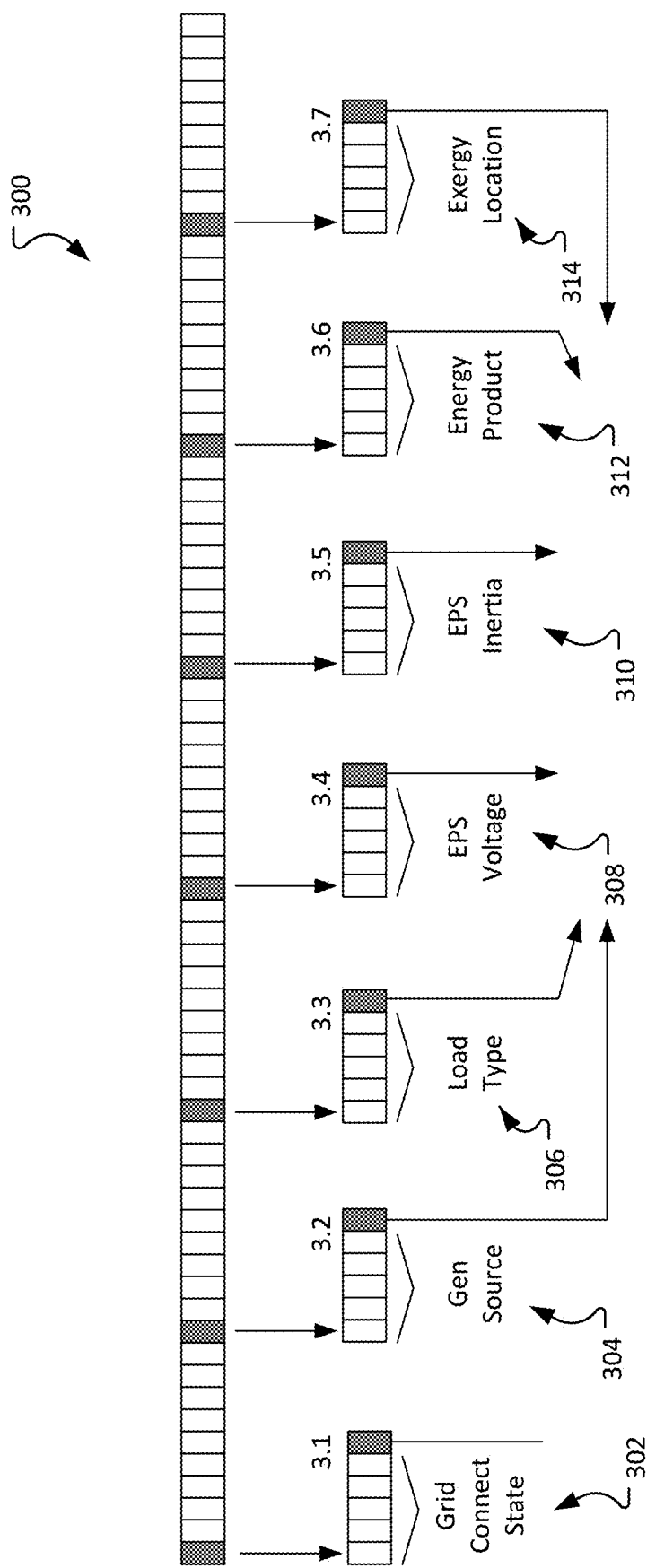
FIG. 3 illustrates an example of an Exergy Token payload.

Exergy Token system incentivizes efficient supply/demand balancing mediums for transactive energy exchanges between participating assets of the type shown in FIG. 3. The Grid Modernization Laboratory Consortium (GMLC) initiative from the US DOE has grouped four broad categories of electric grid service types that can be derived from operation of these assets and that are needed to maintain efficient balance and operation of the evolving smart grid. Exergy provides the means for securing and digitizing all required value elements associated with DER for clearing the market for grid services in these category segments:

Energy-related grid services (peak load management, energy cost, supply capacity)

Regulation-related grid services (frequency regulation, spinning reserve, ramping)

Distribution voltage management

Artificial inertia grid services

These categories relate to broad areas of economic opportunity for a transactive energy system to expose qualified participating resources to market "offers" that can earn them compensation through subsequent value exchange. Historically, the data required by market participants has been very difficult to obtain (under the legacy non-participative utility energy business model), because information collected by utilities is typically limited to that needed by their proprietary and closed energy billing systems. Only recently has the Green Button Data initiative in the US been developed as a voluntary national standard approach to giving utility consumers (or their authorized third party solution providers) access to their personal energy use data. But there is no global standard, and every country faces similar challenges with how to expose data for utilization by the industry without compromising privacy. Any more advanced information on other Area EPS system attributes (that could enable visibility to conditions establishing locational price signals) is collected through their proprietary operational systems and is not disclosed. The token system supports unlocking this data to promote responsive transactive energy service in these categories.

The individual Token element attributes are explained further below, but the concept formation of the digital object/entity data package is conveyed in FIG. 3. This information may be considered the payload portion as described previously, which may be incorporated within a container for execution of Transactive Energy applications and can be subject to the lifecycle process described within this section.

The Exergy Tokens may have no monetary value upon being minted. The underlying data the tokens represent, however, carries inherent economic value in today's power market design. Commercial participants today, as rational economic actors, are expected to see value in access to this data. Accordingly, they are expected to offer compensation (via Exergy Token, at a premium, or perhaps fiat or another alternative settlement channel) to prosumers and consumers who permission access to their data via their Exergy Tokens. Such compensation effectively allows prosumers and consumers to generate Exergy Tokens for themselves by proactive market participation: as they produce and permission more data, they may earn more Exergy Tokens.

FIG. 3 illustrates an example of an Exergy Token payload 300. The Exergy Token payload 300 formation is coincident with the physical process of energy generation, and its formation may reflect a measure of the ultimate yield of that energy into useful work at the served load. The ultimate yield may be reasonable approximated using a loss calculation. The loss calculation can account for physical transmission and transformer losses which factor in among other things; physical proximity of the generation to the served load, temperature induced line resistances, voltage conversion losses, and phase imbalance.

Likewise, when an Exergy Token first runs out of energy running into transformers, inverters, transmission etc., and then upon consumption at load, the token payload may be liquidated retired and the container returned to network circulation. One of the goals for Exergy Token is to reflect and store true locational value. This is contingent on the concept of exergy and ETR standing as the unit measurement of efficiency.

Because the electric power routing path is factored into the formation of the efficiency rating for the token, differentiation is established which factors this energy source location 304 (relative to the consuming load) variation into the value element. Likewise, it may be desirable to differentiate the load type 306 when forming the token. This may be differentiated broadly by simply indicating whether the energy is to be consumed or stored, or in a more refined manner the designation may be more prescriptive in order to identify specific end use load types, which would open up specific Transactive Energy value chains. One such example might be Electric Vehicle charging, where this differentiation could allow the token to enable special rate classes developed by the utility commissions for promoting this socially beneficial end use. This particular example is described further as a potential demonstration.

Beyond the physical attributes of generation, transmission, and load, it is possible to include non-physical characteristics in the formation of the token that can capture aspects of value that may be subsequently recognized. These include environmental, temporal, and social characteristics that could "color" the valuation of the token and assure its integrity while utilized within the Transactive Energy system. The Exergy Token base layer is the data pertaining to the physics of the grid, such as generation source 304, load location, and details of transmission including but not limited to temperature, voltage conversation, and phase imbalance.

Generally, the payload may contain other information such as grid connect state 302, UPS voltage 308, EPS inertia 310, the energy product 312, and the exegete location 314.

Figure 4:
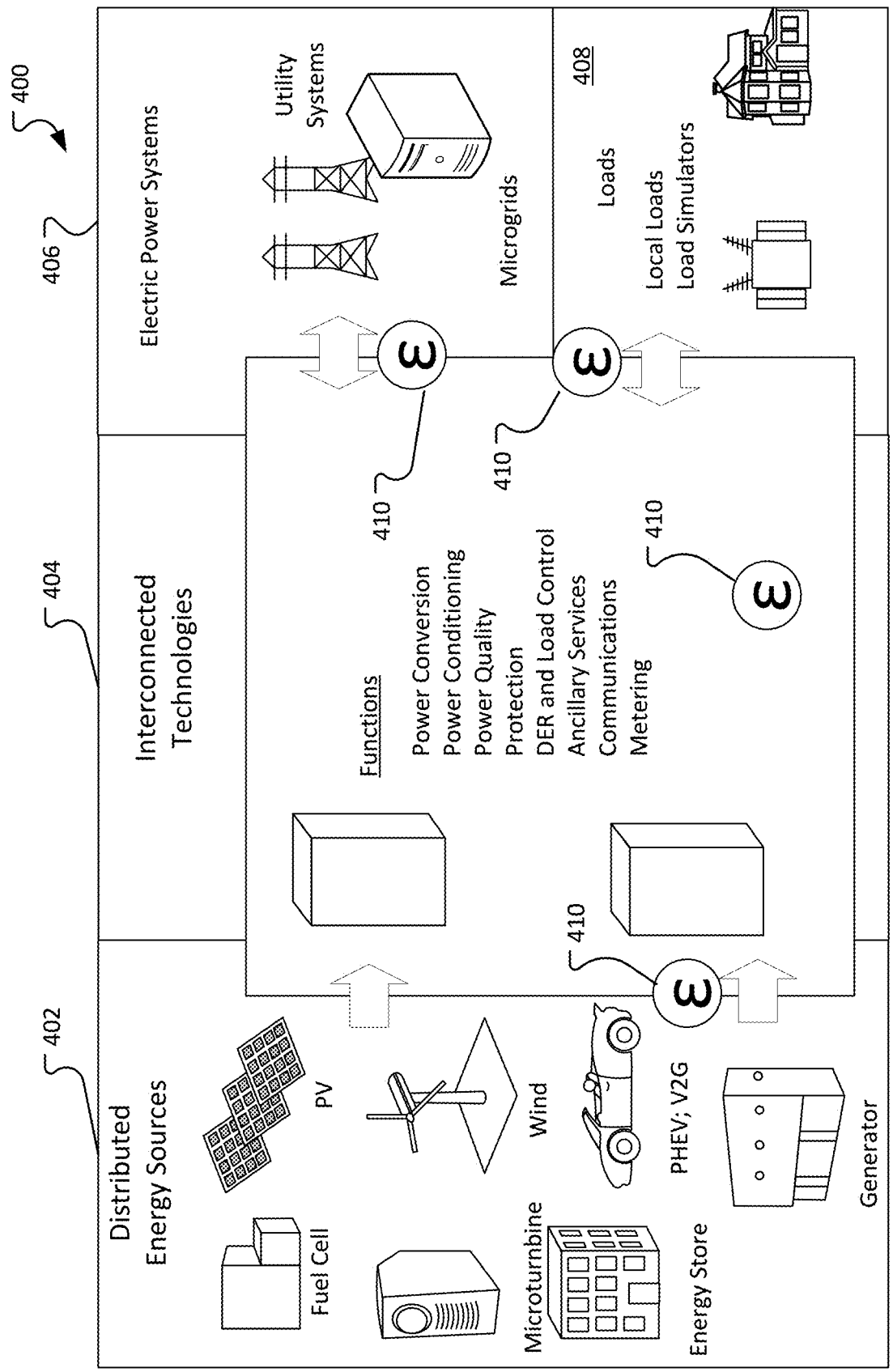
FIG. 4 is illustrates different support territories.

FIG. 4 is illustrates different support territories. The attributes that are sampled and digitized within Exergy come from the types of distributed energy assets, as they exist and operate within a defined service territory. Distributed Energy Sources 402 deals with the creation of energy including, for example, fuel cells, photovoltaic panels, micro-turbines, etc. Interconnected Technologies 404 function as intermediaries providing power conversion, power conditioning, etc. Electric power systems 406 include power utility systems and microgrids. Note that while not listed directly under DER generation assets, the "Loads" class 408 may be able to operate as a service agent when equipped with intelligent IoT based controllers. Collectively, these assets can be used to represent key capacities and state variables to establish effective pricing for transactive energy methods that trigger service delivery offers, and subsequently drive efficient transaction clearing. Each of these systems may use tokens 410 to convey information.

Grid Connection State.

Figure 5:
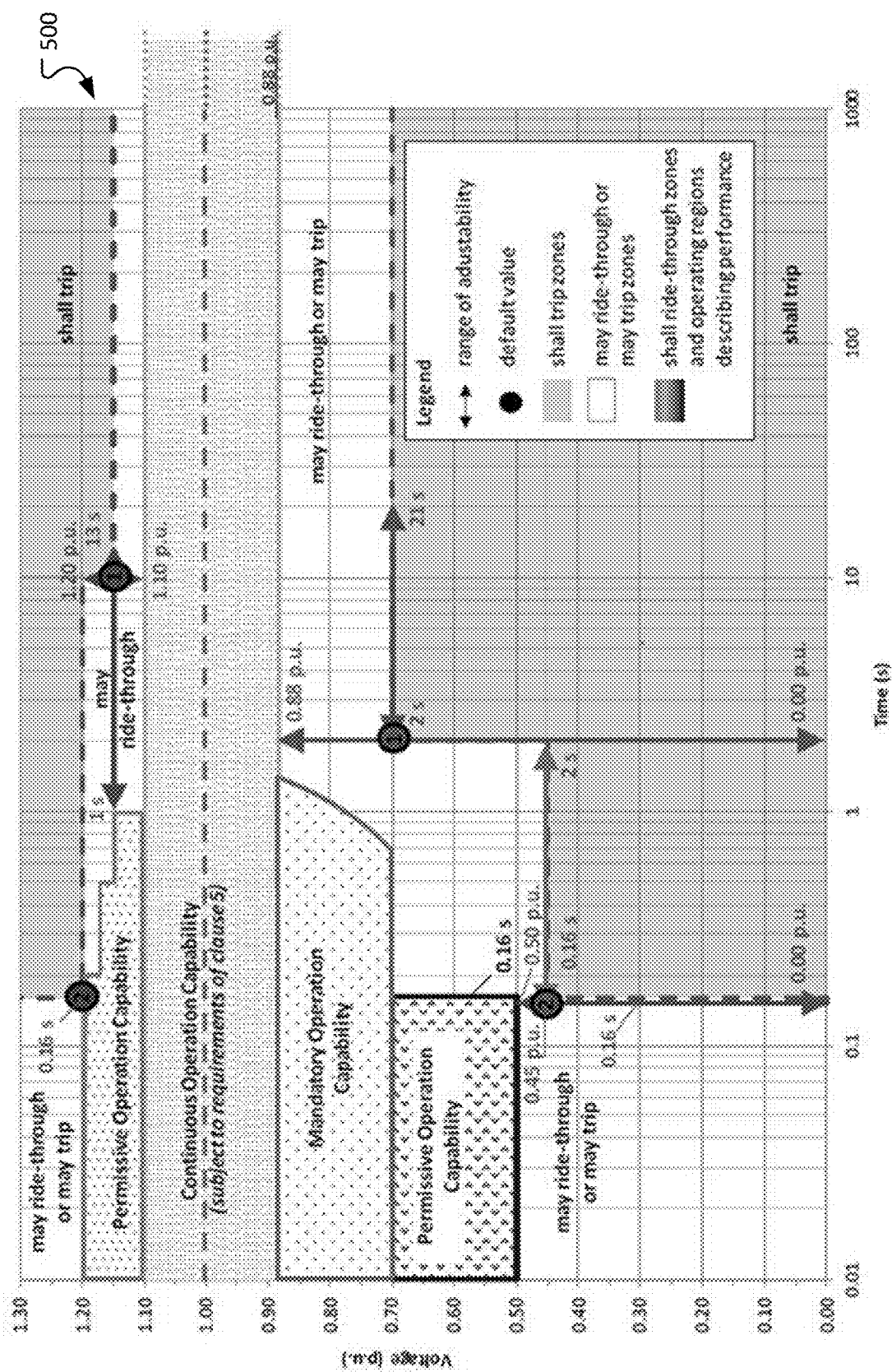
FIG. 5 is a chart that illustrates the bands for Category 1.

Tokens can include an indication (either direct or derived) of the state of distribution grid interconnection at the DER point of common coupling (PCC). When allowed by the area electrical power system (EPS) to remain in ride through mode, operation in this range indicates a point of increased utility grid stress, and as such should increase the value of persistent DER services provided during this time. Note that for system voltage the permissible operating bands depend on the category of DER that is deployed. FIG. 5 is a chart 500 that illustrates the bands for Category 1, which represents the most common (and therefore tightest) performance range in currently deployed DER. Increasing transactive value (designated by higher $$ value) is possible for assets that continue to support grid stability during periods of farther excursion from nominal system voltage.

The Ride Through designation data field can be derived from either an instantaneous or an average EPS voltage measurement that indicates ranges above 1.1 or below 0.9 p.u. from sampling nominal system voltage, or in the future could be created directly from a DSO provided low-latency signal when monitoring at the PCC.

Generation Source Type.

The token system can capture and preserve a designation of the generation source type that creates the unit energy production while at zero carbon emission (ZCE). If desired, the token can allow for more discrete identification through optional sub classification of specific type characteristics of the ZCE generation.

| | Primary Class Use EPA Classes-Carbon Intensity | Optional ZCE Subclass |
|---|---|---|
| Gen Source Type* | ZCE (zero carbon emission) | Wind, SolarPV, Hydro, Nuclear |

This data can come from the nameplate configuration of the generation asset, and must be securely accessed and verified. The attribute can then also support Transactive Energy value capture for non-energy purposes such as Renewable Energy Credits (RECs) or other recognized value streams.

The Exergy Token system can also capture and preserve a designation of the DER Response Classification of the generation assets associated with the unit energy production. This is supported by the Categorization scheme being introduced with the 2017 IEEE1547 DER Interconnection standard. This permits the distinction of DER asset types specifically with regard to their capabilities for two very important Transactive Energy grid support service types: Distribution System Voltage and Abnormal Condition Ride Through. By capturing the appropriate designation the Exergy Token system can become an instrument for monetized grid service that properly values the contribution of the DER as a grid stabilization and optimization service resource. The following table summarizes this classification scheme.

| | Category | Characteristics |
|---|---|---|
| Distribution System | A | Typical DER capabilities |
| | B | Better response capabilities with |

| Category | | Characteristics |
| --- | --- | --- |
| Voltage (V, Vr) | | supplemental control equipment, and required where there are high penetration of DER subject to high load variation. |
| Abnormal Condition | I | Typical generally available DER response capabilities |
| Ride Through | II | Better response capabilities |
| (V, F) | III | Advanced DER Response capabilities ref CA Rule 21 smart inverters communications enabled functions |

Table DER Response Categories (per IEEE1547-2017 revised)

The IEEE 1547 standard also provides in its informational Annex a categorization of representative (anticipated) specific generation types operating in specific end use profiles, through which these combinations are identified as requiring specific Abnormal Ride Through Category treatment. This may prove useful in the Exergy Token system design for supporting Transactive Energy applications that require exposure to these characteristics.

Load Coupling Classification.

The nature of the served load can be an important distinction for the token to represent the value of optionality for the energy consumption. The primary differentiation should be whether the generated energy is immediately consumed for useful work (ie Exergy expended) or stored for future work (Exergy preserved).

A refined treatment of this attribute could allow for enablement of specific use profiles that permit exposure to specific Transactive Energy value streams within specific interoperability control protocols.

| | Primary Class | Optional Load Coupling Subclass |
| --- | --- | --- |
| Load Coupling Classification | Consumed, Stored | Consumed: Exergy Conversion Ratio? Stored: EV, Battery, Flywheel, Pumped hydro, Thermal, |

An important aspect of this attribute is the flexibility that it can give in conjunction with other attributes. Distinguishing the coupled Load Type and binding it to an Islanded Grid Connect state could allow for very specific treatment of served loads within a Transactive Energy framework. This distinction might allow the Exergy Token system to be used for prioritizing mission criticality within an Islanded Microgrid, for example. Alternatively, for example, the charging of an Electric Vehicle might be valued more highly as an energy use than powering a resistive heating element.

EPS Voltage.

The voltage levels of the system are important as a proxy measure of system stability, and can work as value element in the Exergy Token system in conjunction within the classifications. These voltages can be measured at the PCC for both the generation and the load within the DER and can be compiled into the token system as the verification of DER operation that falls within the Distribution Voltage support designation identified in either the EV Managed Services Use Case or the Microgrid use case Deviations in EPS voltage can be corrected through compensated insertion or absorption of active power (kVA) or reactive power (kVAr) by any of the properly valued DER assets that are delivering services under TD2.

Measurement and encapsulation of this attribute within the token system also permits valuable system state data to be preserved for development of future Transactive Energy market pricing models and subsequent derivative contracts that may support the TD3.

Voltage Support services are typical of the services found in Time Domain TD2 and TD3.

EPS Inertia.

Variations in EPS inertia can show up in changes to the phase angle or system frequency that can be corrected by the insertion or absorption of kVA (real power) or kVAr (reactive power) in accordance with the Category I, II, or III Voltage and Frequency-Ride-Through characteristics. This requires relatively fast reaction capability with minimal latency from either the network monitoring and control data channels or the inertial physics of the electrical response.

Phase angle and frequency may be measured with fairly high precision by the Phasor Measurement Unit (PMU). These devices were typically deployed within the high voltage Transmission lines but are becoming more decentralized and are beginning to appear at EPS sub station relays.

Frequency Support services is typical of the services found in Time Domain TD1 and TD2.

Energy Production.

The traditional unit of billable electric power over time (generally expressed in kW-hr) represents the core value element that literally "creates" the commodity to be traded within the Transactive Energy system. When this traditional energy unit is digitized in conjunction with other attributes the opportunity is opened up for more refined and efficient Transactive Energy applications.

The rapid advancement in IoT technologies and high speed telecommunication networks is leading to the acceleration of Smart Meter platforms. Incorporating this smart meter data into blockchain-enabled tokens allows this core value element to be "tagged" with important information that enables intelligent and rational transactions. The token system built around this attribute supports the efficient supply/demand balancing for this commodity by reflecting attributes such as the state of the electric grid, nature of the generation and load, and a measure of efficiency (or proximity) that reflects any losses or congestion in the system.

Location Proximity.

The geospatial location of both the generation source and the coupled load, along with characteristics of the circuit path, play an important role in the determination of relative value for Transactive Energy. The existing wholesale market structures can create a Locational Marginal Pricing (LMP) for the energy that varies over time based on aggregate supply and demand balance.

A Distribution (D) component that is added to this can create a pricing difference function applied to the LMP that reflects the congestion level experienced at the last segment of circuits that serve the end loads. More than any other indication, this component can serve as both a short term (request for services) and long term (build new capacity) market signal to drive the incremental participation of the DER technologies.

Ride Through requirements also apply to Frequency ranges. The following diagram illustrates the regions of operation for the mandatory and optional EPS abnormal frequency deviation ride through for the Category I, II, and III DER.

Short descriptions of these industry application segments are provided below in preparation for the specific discussion of Use Case implementation. The sweeping arrow represents a solution evolution spanning several industry segments— leading to a more tightly integrated overall electric power system that increasingly operates through participative and market-driven mechanisms.

Hyperlocal.

This group of token-enabled use cases permits energy production and consumption services at the very edge of the electric grid. These services yield both environmental and efficiency benefits, and support local community resilience. The group of four hyper local Use cases identified here are; Non-Energy Trading, Peer to Peer Energy, EVSE Peer Sharing, and Islanded Campus Microgrid.

DSP/DSO/Utility.

This is the segment of the electric power market that is the slowest to adopt new competitive business models, as most of these entities operate under monopoly franchise regulation and are incented to maintain high reliability as their primary operational goal. Increasing amounts of connected DER at the edge of the grid however now require these grid operators to obtain more precise grid state data monitoring, and the variability of this DER drives a growing need for distributed grid operations services. Traditional control systems used by these operators do not scale and are not economically viable, opening up the potential for increasingly transactive means of using the Local Energy assets for that purpose. The group of five common Use cases identified as generally residing in this segment are; DER Aggregator Service, EVSE Managed Charging, Connected Community Microgrid.

Retail Electric Market.

Unlike the distribution services provided by entities listed above, this energy commodity supply chain is undergoing a more recent transformation to the competitive market. Not all US states have yet moved to this model, but where these retail energy providers are allowed to serve customers (through the legacy Utility DSO wires) there is an opening for differentiating by energy provenance. The following Use Cases are typical for serving customer needs in this segment, although use of blockchain solutions generally drive higher complexity because of the multipartite relationships.

Wholesale Market.

The competitive electric power wholesale market concept was created in the US during the 1990s under a period of deregulation of the generation markets. By pooling multiple generator outputs that are "bidding" into a competitive wholesale market, and coordinating that generation with aggregate load across specific regions through central balancing authorities, this competitive process brought forth investment and innovation to lower the energy cost and encourage clean power production.

One example of a system that can use the token system is the Brooklyn microgrid. LO3 Energy has developed a blockchain-based energy platform called TransActive Grid that's already running the hyper-local Brooklyn Microgrid. Blockchain technology allows devices at grid edge to securely and directly transact for PV-generated Energy sale between microgrid participants. The Exergy Token System can more efficiently implement this use case, and can also allow for expansion to adjacent use cases as the Brooklyn Microgrid evolves into a broader and more integrated DER Solution. A goal of the XRG approach is to enable a common extensible platform that can facilitate valuable network utility from diverse but synergistic use cases, opening paths for effective community participations. The section below illustrates this evolution concept as envisioned for the BMG. Each referenced Use Case is then examined in more detail within the next section.

Peer to Peer Energy Sales: The Base Case

Prosumers and user's energy interactions can be tracked and recorded on the blockchain. Soon, users can be able to set preferences via a mobile app or web interface, enabling customer devices and local grid systems to transact this energy exchange in near real-time, through self-executing contracts that seamlessly blend local energy with grid supplied energy.

Tracking Non-Energy Value Exchanges: Recognizing more Value

Non-energy value can also be held by the blockchain for the purpose of transacting, for instance, Renewable Energy Credits (RECs). Neighbors may value solar-over gas-generated power, or even their relative's energy over a traditional utility central generator utilizing fossil or nuclear fuels stranger's. These value of environmental attributes like theses can be different in communities all over the world, but the Exergy Platform's dual token structure allows for these differences to remain localized and also to change at the pace of regulatory reform that can expose market incentives to shape transaction behavior.

As the Exergy Token becomes a platform for digital representation of the essential DER attributes (ownership, performance, and participation) it is possible to aggregate and manage these resources into a useful application for the microgrid operators, whether those microgrids are connected to (paralleled) or are separated from (islanded) the areas electric power system. Some potential services categories identified by the Department of Energy in its current Grid Modernization initiative provide a framework for classifying these services:

Energy-related grid services (peak load management, energy cost, supply capacity)

Regulation-related grid services (frequency regulation, spinning reserve, ramping)

Distribution voltage management

Artificial inertia grid services

For the most part, the control systems supporting this process have evolved within the Transmission and Generation community to utilize industry standard monitoring and data systems that are built with robust reliability and security safeguards, along with specialized equipment to facilitate fast frequency response. Although Transactive Energy methods are being evaluated for clearing large wholesale energy exchange, moving this segment of the industry to token based solutions that incorporate the more Local Energy segments at this time would be highly complex and offer less added value.

There are currently several practical limitations and barriers to achieving the design and use of a token-based Transactive Energy platform which are identified below:

System Control vs Transactional Exchange—

The time domains required to utilize transactive energy for system control applications are typically too short to utilize blockchain effectively.

Exchange of energy in relatively large blocks can be accomplished because there is sufficient time to buffer and process Lack of standardized interoperability protocols Rigidity of jurisdictional regulation (ie siloed technology)

The individual Use Cases described in the evolution of the Brooklyn Microgrid are explained in more detail within this section, specifically in terms of the application of the federated token construct to achieving services relevant to the Use Case. An attempt is also made in this section to articulate how the common token system can allow a bridge into adjacent Use Cases that ultimately link different segments of the broader energy ecosystem.

Use Case 1—Local Energy Sale

The current method utilized for this service is blockchain ledger implementation using specific hardware (known as TAG meters). This method permits the designation of certain kWh units of locally produced energy to be "tagged" and offered for consumption by adjacent local participants using the same metrology component. The transaction is "cleared" within this closed system between the meters through machine-to-machine management of blockchain ledger entries.

This application can evolve to use the token system. Within this construct, the characteristics of the produced energy can be refined to permit capture of unique attributes (or provenance) that may reflect (and respond to) important pricing influence for the Local Energy network operation. It is also possible to expose these tokens to a dynamic market pricing that can better reflect the true costs and benefits of the locally produced energy. In order to accomplish this, the token system must acquire two of the key attributes needed to facilitate this basic use case, specifically Gen Source 304 and Energy Product 312 of FIG. 3

The two primary attributes needed for the effective implementation of the Local Energy transaction are identification of generation source (i.e. clean renewable generation) and the unit of energy created for consumption. These data can be incorporated into the token system blockchain.

The token system captures and preserves a designation of the generation source type that creates the unit energy production designated while at zero carbon emission. If desired, the token could allow for more discrete identification through optional sub classification of specific type characteristics of the ZCE generation. This may allow later coupling of the solution into the wholesale generation markets segment. For example, the gen source type (short for generation source type) may include a Primary Class Use EPA Classes—Carbon Intensity of, for example, zero carbon emissions (ZCE), and may also be associated with ZCE subclasses (wind, solarPV, Hydro, Nuclear).

The token system can also capture and preserve a designation of the DER Response Classification of the generation assets associated with the unit energy production. This is supported by the Categorization scheme being introduced with the 2017 IEEE1547 DER Interconnection standard. This permits the distinction of DER asset types specifically with regard to their capabilities for two very important Transactive Energy grid support service types: Distribution System Voltage and Abnormal Condition Ride Through. By capturing the appropriate designation, the token system can become an instrument for monetized grid service that properly values the contribution of the DER as a grid stabilization service resource. These advanced grid services can be described further below.

The traditional unit of billable electric power over time (generally expressed in kW-hr) represents the core value element that literally "creates" the commodity to be traded within the Transactive Energy system. The token system can represent the embodiment of the efficient supply/demand balancing medium for this core energy commodity by allowing for later inclusion of the (approximate) losses that are encountered between the generation point of origin and the eventual consumption.

The granularity (or frequency) of the metering and encoding of energy is directly related to the time domain aspects described in Section 2.0. At a minimum, the energy commodity purchase can be cleared in "blocks" of 5, 15, or 60 minutes as the current wholesale market operates. If this sampling is performed fast enough however, then certain advanced grid service transactions which rely on dynamically varying the power flow can also be enabled through the same token system.

Use Case 2—EV/EVSE Services

The use case(s) for token-based electric vehicle services starts with the efficient location of, and access to, charging stations that can deliver the locally produced energy into the onboard energy storage system (aka EV battery) at power transfer rates that are optimized. This allows for a natural evolution from Use Case #1 of a Community Energy system operating on the token to grow its functionality and efficiencies into the transportation function within the Hyper Local domain. Note that this energy storage element could also be an equivalent sized stationary battery that is collocated with the renewable generation as well. These types of integrated solutions are rapidly gaining market penetration.

In a more advanced application of this Use Case, which both enhances and expands beyond the local energy microgrid, the token-enabled EV charging network supports a proactively aggregated and managed charging service that can take advantage of the inherent flexibility of the EV load profile. When many electric vehicles can be pooled, and their owners have a means of transacting on the flexibility of their load profile, an important value thread can be exposed in the form of grid services to the balancing authority. This offers a natural bridge of the token based solution into adjacent use cases that reside in the DSO/DSP segment shown in FIG. 2. The full evolution in this Use Case leads inevitably to bidirectional power flow for full V2G operation and could therefore ultimately connect common transactive energy value streams with the Energy Retail and Wholesale segments. The engagement of many non-traditional participants into the token system value chain is also likely— examples of this are Vehicle OEMs and Dealers as well as commercial Fleet Managers.

Of particular note, the traditional utilities found in the DSP/DSO segment are all actively seeking mechanisms to expand their rate-based support of an intelligent EV charging infrastructure; the token system offers a potential path for these utilities to incorporate a customer service that supports this Use Case and also bases their stake in a value chain tied to that investment.

In addition to the Energy metering, the two additional attributes needed for the effective implementation of the EV Recharging transactions are identification of Load Type 306 (ie specifically energy storage) and the Location 314 (of FIG. 3) where the battery charge consumption (and ultimately reverse flow energy discharge) takes place.

The nature of the served load can be an important distinction for the token to represent the value of optionality for the energy consumption. The primary differentiation should be whether the generated energy is immediately consumed for useful work or stored for future work. The EV itself might self-identify as an electric transportation asset, which can allow unique participation options within a Transactive Energy framework.

A refined treatment of this attribute could allow for identification of other use profiles that permit exposure of the EV to specific Transactive Energy value streams and utilization of the token system within specific interoperability control protocols that are fast emerging such as the IEEE 2030.5 Smart Energy Profile or the Open ADR transactive energy profile.

Distinguishing the coupled Load Type allows for very specific treatment of served loads within a Transactive Energy framework. This distinction can allow the token system to be used for prioritizing mission criticality of the connected EV within an Islanded Microgrid, for example. Alternatively, for example, the charging of an Electric Vehicle can be valued more highly as a deferred energy use over the immediate powering a consumptive heating element for example. From a grid balancing perspective, the coordination of power flow to EV batteries may help address the conundrum of the "duck curve" in areas where Solar PV generation is driving narrow windows of supply over capacity. These are all services that can be tokenized and therefore monetized.

The geospatial location of the EV is important for the involvement of this storage asset within the Transactive Energy network. Existing wholesale market structures create a Locational Marginal Pricing (LMP) for the energy that varies over time based on aggregate supply and demand balance, while the Distribution (D) component that is added to this can create a pricing difference function applied to the LMP that reflects the congestion level experienced at the last segment of circuits that serve the end loads. In other words, the time that energy is consumed and where it is generated or used becomes as valuable as kWh, and likely can increase in importance the more both supply from renewables and demand from loads like EVs increase. It is likely the LMP pricing model to manage intermittent, multi-party energy markets can also need to evolve.

More than any other indication, this component can serve as both a short term (request for services) and long term (build new capacity) market signal to drive the incremental participation of the electric vehicle. The blockchain based token system can ensure that these signals are efficiently created, communicated, and consumed (ie. responded to).

When the full pricing signal reflecting true locational marginal costs can be delivered to the smart charging system, automated decisions can be made to delay or accelerate recharging to optimize the energy transaction based on individual needs and functional price elasticities. This is generally referred to as Smart Charging. As the auto industry begins to deploy autonomous vehicle platforms, a discretionary location dynamic can become possible that could swarm low utilization EV assets to connect their batteries for grid services at locations that deliver meaningful impact. There are three general categories of services that are of value to (or from) Electric Vehicles that could be exchanged within the transactive energy model. These are defined by the perspectives of two interest/stakeholder classes, 1) the vehicle owner (or in the future case of autonomous vehicle ridesharing operations—the fleet owner) and 2) the electric power delivery system operator. We've generalized these service categories and stakeholder perspectives as follows:

Vehicle Charging—of value to EV owner to the extent that mandatory minimum drive range is delivered exactly as expected. There is generally no preference on energy source or power flow as long as above condition is met. This basic energy transaction falls into the time domains that are easily handled through blockchain.

Timed charging—This is the simplest of the smart charging paradigms, if grid capacity (or a certain renewable supply mix) is available—then charge at the maximum power draw. This has value to both stakeholder classes in the sense that feedback from the grid can facilitate appropriate draw on grid capacity in order to supply sufficient electricity to provide anticipated vehicle range. A virtuous circle, but also may involve some additional complexity in managing through blockchain(s).

Demand charging—This is a sophistication of timed charging that considers the draw on the local grid from multiple vehicle charging demands, which would include the pace of charging required to meet consumer expectations for range availability in time for next vehicle use. Demand charging would include timing of charging use and the rate of charging—the amount of total charging demand in kW compared to the maximum possible charging demand. For example, an electric vehicle departing at 6 AM and needing two hours and 50 miles of travel might only need to draw 5 kW starting at 3 AM in order to meet driving demand, while a vehicle expected to need 5 hours of travel and 200 miles, would need to draw 16 kW starting at 1 AM.

Bidirectional Power flow. An advanced electric vehicle service in support of the grid can include discharging the vehicle battery in support of the societal needs related to electric grid services. When this is performed primarily as a resilient energy sourcing (ie powering a facility during grid outage) the blockchain based token system can support the associated transactions. If this function serves to coordinate Voltage or Frequency regulation then the faster time domain requirement may pose a challenge to delivering these services on a public blockchain.

Use Case 3—Microgrid

The use case(s) for connected DER Microgrid open important value streams through Transactive Energy services. This allows for a natural evolution from Use Case #1 (a Community Energy system that is simply creating and selling Local Energy or RECs) into leveraging the functional utility of the underlying DER assets to respond to large commercial building campus or broader distribution grid balancing needs. The DER microgrid can exist in one of two discrete states—grid connected (or paralleled) or grid-disconnected (islanded).

The simplest implementation of this Use Case through blockchain is—paradoxically—the more complicated "grid connected" mode of Microgrid operation (as represented by the Grid Connect State 202 of FIG. 2). This is because the overall inertia of the larger Area Electric Power System (Area EPS) allows for longer response times (moving into Quadrant 2 from the Time Domain graphic) where the token can then utilize buffering techniques for the faster services. The Islanded Microgrid (or Local EPS) has far less inertia to rely on during self-balancing and thus requires much faster control feedback loops—better solved through more direct and dedicated control systems that are part of the microcontroller (and therefore not the "transactive energy" driven control.)

Two additional attributes needed for the token system to effectively engage Microgrids into transactive grid service opportunities are Grid Connection state 202 and the Area EPS Voltage 208 and Inertia states 210 (of FIG. 2) in order to properly characterize the A-EPS state (ie level of instability) at the time of the DER service provision. This is fundamental to properly valuing and compensating the assets.

Grid Connect State.

Three mutually exclusive and discrete states are possible, and the state data can be captured from an IEEE1547-compliant inverter either locally from on-board data registers or remotely through its communication channel. These states are listed below in order from lowest to highest expected commercial value for the Transactive Energy participants. Note that although all of these states can support preferential peer-to-peer exchange based on those anticipated higher Exergy values, only the second state can exclusively require that mode of operation. It is anticipated that the first state can generally bias toward preferential transaction from this mode, where the third state can likely bias toward preferential grid service transactions.

Parallel Operation (steady state connected)

Islanded Operation (steady state disconnected)

Ride Through (temporary state, permissible region connected)

EPS Voltage.

The voltage levels of the system are important as a proxy measure of system stability, and can serve as a value element in the token system in conjunction with the other measured attributes. These voltages can be measured at the PCC and both the generation and the load within the DER, and can be compiled into the token system as the verification of DER operation that falls within the Category A or B Distribution Voltage support designation identified in Section 2.2. Deviations in EPS voltage can be corrected through financially compensated insertion or absorption of active power (kVA) or reactive power (kVAr) by the properly valued DER assets.

Measurement and encapsulation of this attribute within the token system also permits valuable system state data to be preserved for development of future Transactive Energy market pricing models and subsequent derivative contracts, and begins to open up the currently opaque grid data that is inhibiting the innovation and efficiency gains offered by Transactive Energy solutions.

EPS Inertia.

Variations in EPS inertia can show up in changes to the phase angle or system frequency that can be corrected by the insertion or absorption of kVA (real power) or kVAr (reactive power) in accordance with the Category I, II, or III Voltage and Frequency-Ride-Through characteristics identified in Section 3.1. This requires relatively fast reaction capability with minimal latency from either the network monitoring and control data channels or the inertial physics of the electrical response.

Phase angle and frequency may be measured with fairly high precision by the Phasor Measurement Unit (PMU). These devices were typically deployed within the high voltage Transmission lines but are becoming more decentralized and are beginning to appear at EPS sub station relays.

Microgrids that are designed to be flexibly operated in parallel with the Area EPS are becoming commercially feasible with advancement in the fields of smart inverters, IoT, advanced communication networks and protocols, high power solid state switching electronics, and related control system technologies. Design methodologies such as the DOE Sandia Labs' Energy Surety Microgrid™ (ESM) approach are developing blueprints for implementing these flexible distributed energy resources for delivering various combinations of Local and Area EPS grid services. The US Department of Energy is also advancing significant work on Grid Modernization under their DSPx program (Distribution System Platforms—Next Gen) where DER incorporated into Microgrid configuration can interoperate and participate seamlessly with the connected Area EPS.

Potential Benefits

Preferential NORMAL (Blue Sky) dispatch of highest value (most efficient, cleanest) generation Low disruption transition services between Islanded and Connected states Enables a connected DER in RIDE THROUGH (Grey Sky) to be fairly compensated for delivering valuable Grid Services from the classes shown below.

Grid Service Class

Distribution voltage management

Artificial inertia grid services

Regulation-related grid services (frequency regulation, spinning reserve, ramping)

Figure 6:
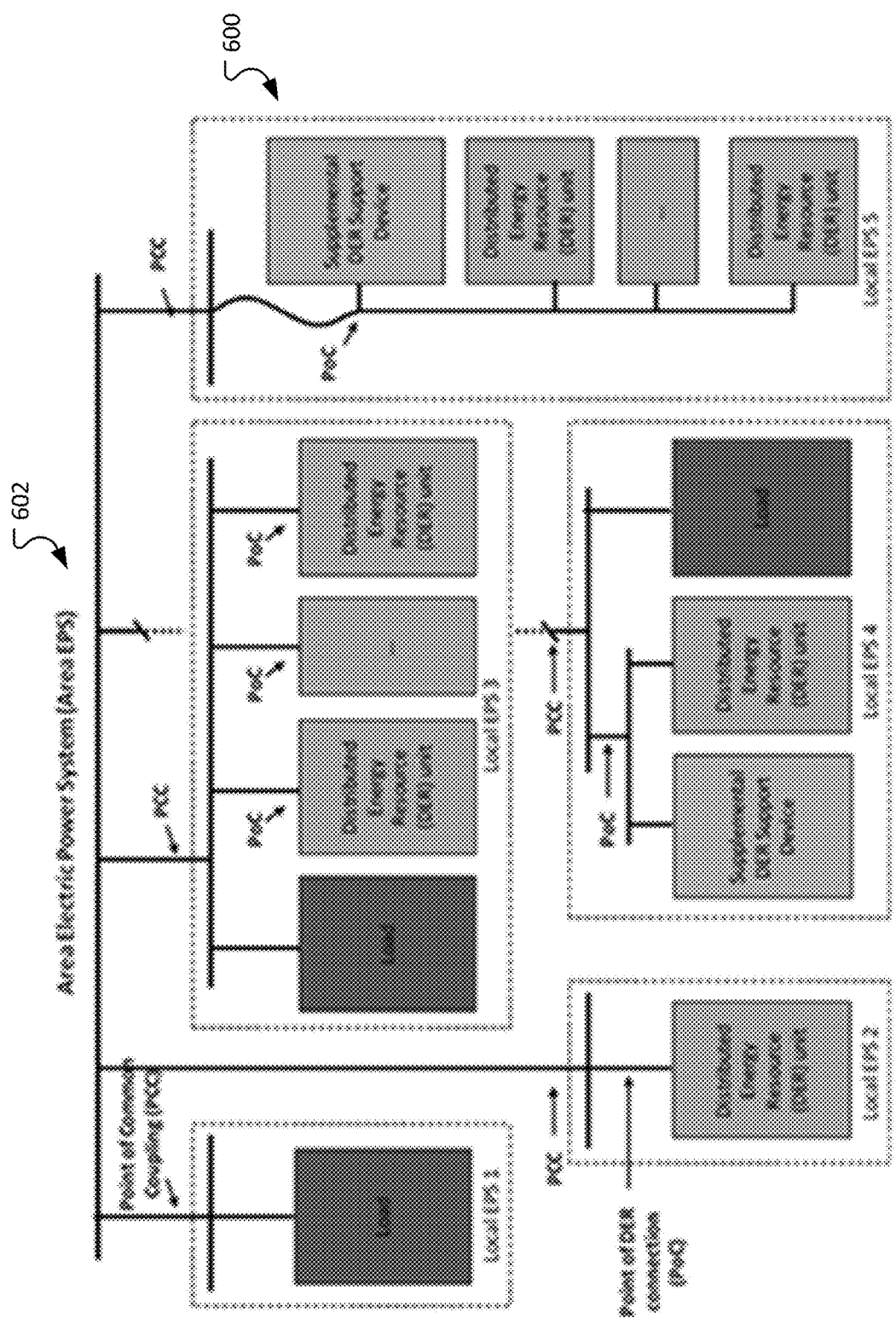
FIG. 6 illustrates a Local EPS microgrid that is connected at its PCC and is operating in parallel with the Area EPS.

FIG. 6 illustrates a Local EPS microgrid 600 that is connected at its PCC and is operating in parallel with the Area EPS 602. Such a microgrid 600 can serve as a valuable resource if the local generation and/or intelligent load response DER can automatically respond to periods of Area EPS instability where voltages or frequency are beyond normal operating bands. These unstable conditions are increasingly likely as penetration levels of variable generation rise along individual distribution grid feeder circuits. This application is specifically being enabled by the rapid advancement of IoT sensor and actuator technology coupled with low latency communication networks, where balancing can increasingly be automated at the grid edge through Hosting Capacity services that begin to extend and evolve some wholesale ISO/RTO control models down to the retail DSO level.

Having these services implemented through Transactive Energy methods using the token system can open the market for a far more decentralized grid. The major beneficiaries of this can be the resilient communities that invest in their Hyper-Local energy ecosystem while also preserving options for flexibly supporting the electric Distribution System Operator (DSO) that needs to add circuit specific balancing tools within their franchise, and seeks to drive their business model toward demonstrating increasing Hosting Capacity for DER on their distribution system. This may also open up the opportunity for demonstration of innovative new utility business models where shared risk and return can help break down current regulatory barriers to more efficient solutions.

The Exergy Token system plays dual roles for the connected microgrid—one for "blue sky" operation and a second for distressed grid state that may result from large fluctuations in circuit branch DER output, which could result in extended periods of "ride through" connection—not quite tripping the microgrid and thus enabling persistently connected DER assets (see FIG. 3.1) to help stabilize and restore the Area EPS. This use also supports seamless power circuit switching for the transition between these two states, using the common token to enable the dynamic state transition as well as for the relevant grid service transactions required within each relatively steady state.

Normal Operation (Blue Sky).

Because operating in this mode is a typical steady state, the normal operating priority can encourage local generation to serve local load based on the most economic transaction point when all losses are considered along with other non-energy provenance attributes. The properties of Location Proximity and Energy Production can supply signals that reflect efficient energy purchase and distribution locally, and can be rudimentarily accomplished despite metering and franchise barriers as a means to inform and enable regulatory reforms that could make this a more mainstream solution. The connected DSO/DSP utility along with the Retail Energy provider can likely move to a standby tariff structure that could be implemented through the token system which can allow service billing based on the "readiness" of the Area EPS to cover local generation deficits. Furthermore, a "QoS" or quality of service dimension could be enabled through the token system which permits competitive differentiation by participants in these provider segments. These topics can receive additional elaboration in the upcoming Business and Regulatory papers.

Ride Through Operation (Grey Sky).

Recall that the token attributes support the distinction of grid connection state, generation type, and load coupling. These features may be used within a microcontroller system to identify and quantify the relative value of the generation supply along with that of flexibility of the load to achieve a transactive "clearing" function and ensure that the distressed EPS can call on the connected Microgrid for support. If the economic advantage of these services exceeds the opportunity cost of degraded microgrid self-service, Transactive Energy services can proceed. In addition, the demonstration can seek to show how the token system can enable graceful separation of the microgrid into or out of an islanded state as a form of certified transaction.

The revised IEEE 1547 DER interconnection standard designates regions of permissible operation of the DER assets relative to allowable voltage and frequency deviations within the hosting Area EPS. Operation of the DER within these permissible regions allows a preserved grid connection to potentially serve as the conduit for providing any of the identified Grid Service classes previously identified. Although this operating mode requires tighter coordination with the DSO/DSP segment, it remains within the technical feasibility of a token system solution that can unlock the data needed for creating market signals that can solicit the response of the DER for required balancing and reliability services.

These flexible states of the Area EPS-connected microgrid play an important role in moving this Transactive Energy application into the mainstream. It is envisioned that with the advent of technologies such as SiC high power switching and ubiquitous IoT, the connected Microgrid can become an extremely valuable and responsive EPS asset.

Figure 7:
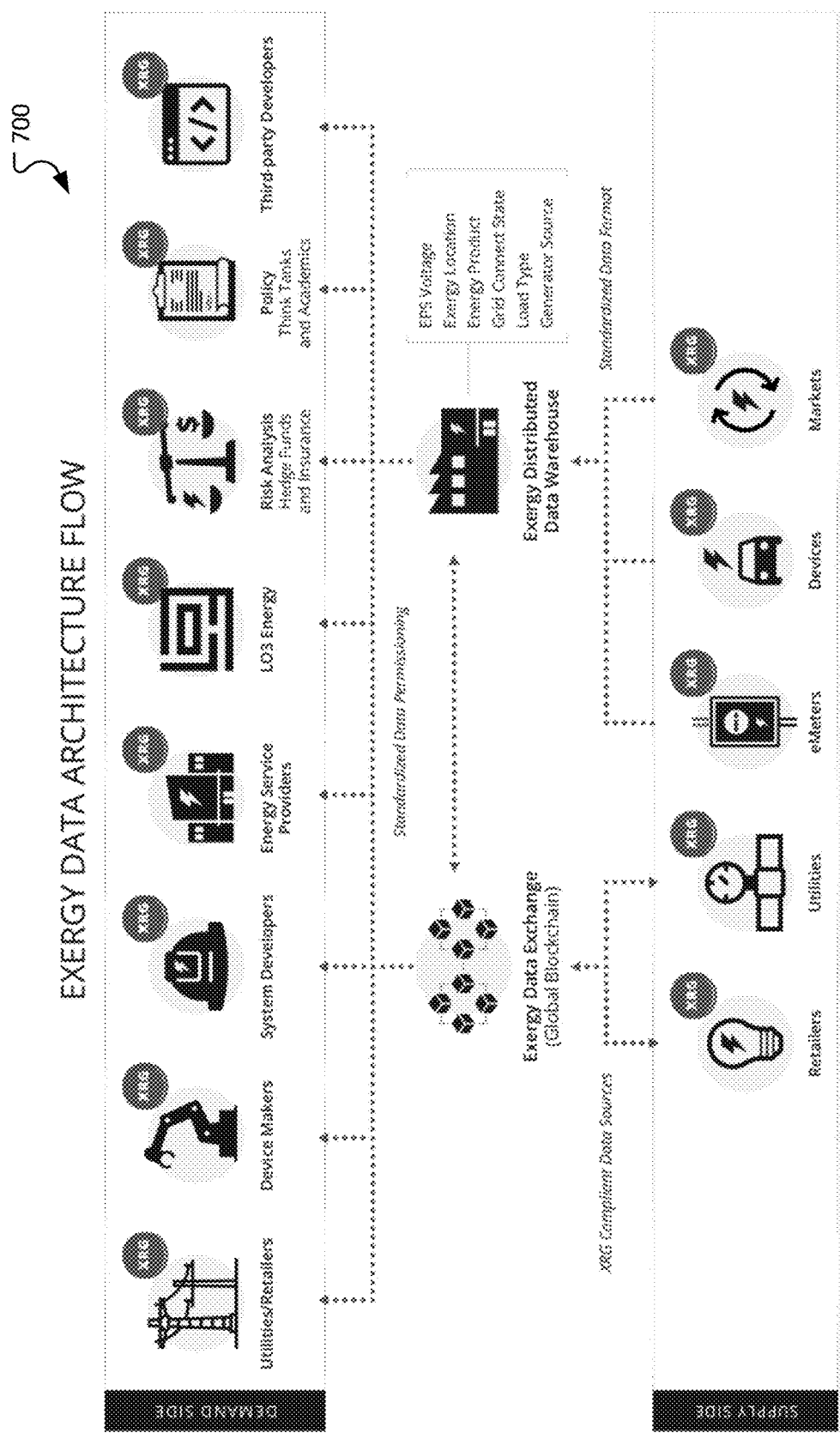
FIG. 7 illustrates an example Exergy data architecture flow.

FIG. 7 illustrates an example exergy data architecture flow 700. The exergy data architecture outlines sources of supply and demand and core platform components for storage, management, permissioning and access. A hierarchical overview of Exergy data architecture including data flows to and from devices, distributed energy marketplaces and core platform components.

Figure 8:
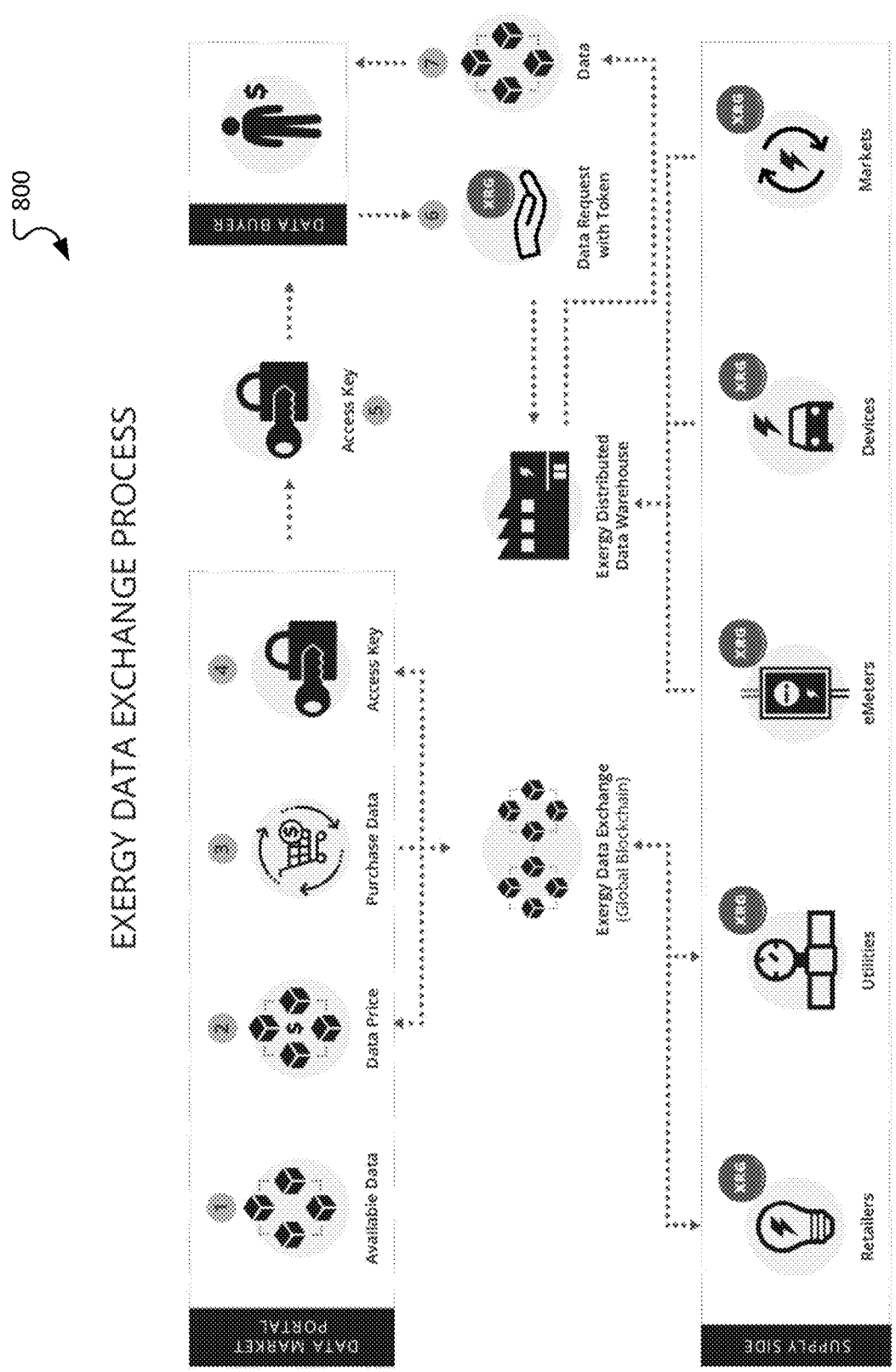
FIG. 8 illustrates an example Exergy data exchange process.

FIG. 8 illustrates an example exergy data exchange process 800. Flows for the XRG token among core Exergy participants and stakeholders, including critical functionality for permissioning, access, management and security. Process flows specific to the Exergy data marketplace which collectively showcase an order of operations and core functionality for securely accessing data from a distributed data warehouse.

Figure 9:
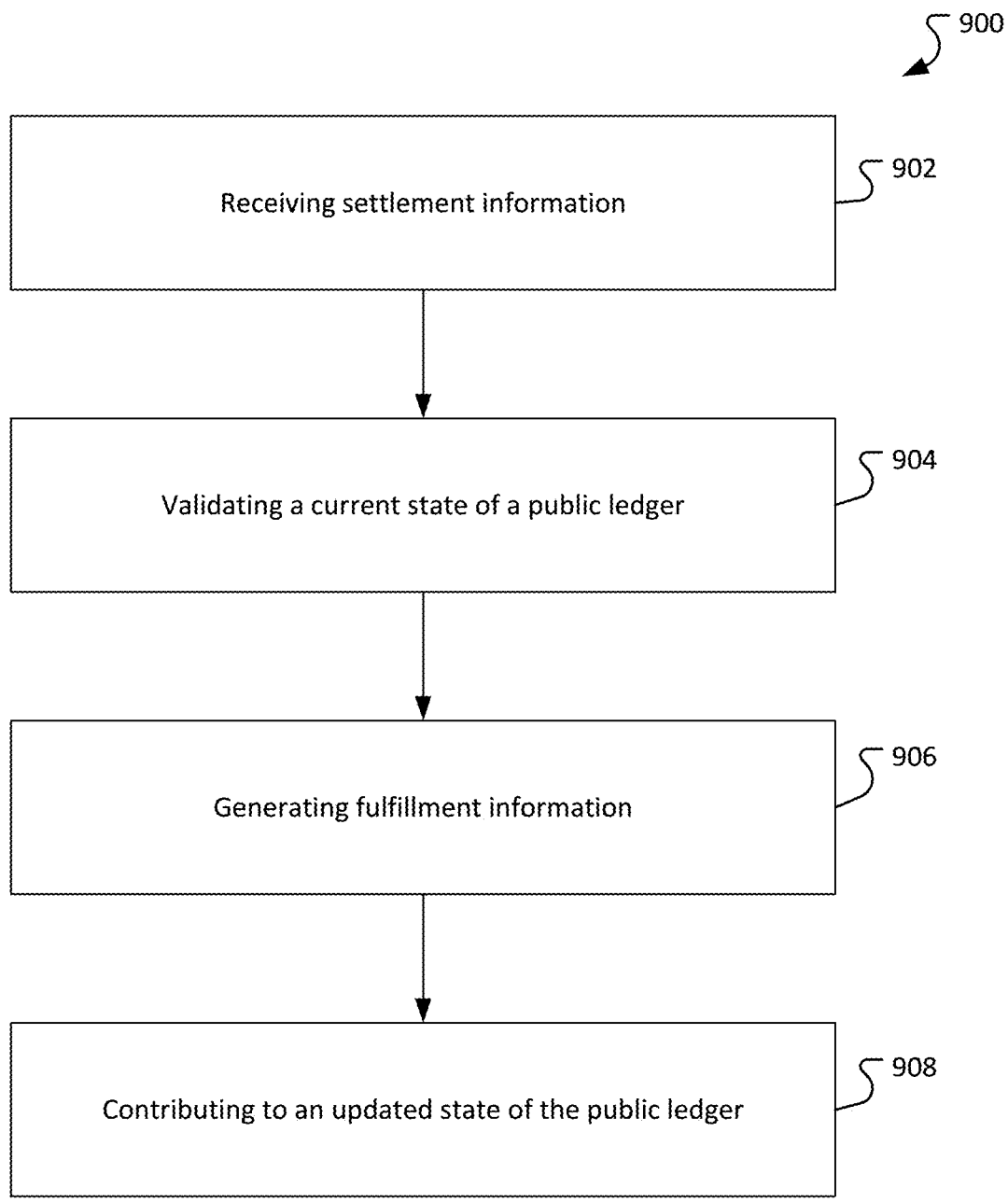
FIG. 9 illustrates an example process performed using the Exergy Token.

FIG. 9 illustrates an example process performed using the Exergy Token.

The process 900 receives settlement information from at least two nodes in a network, the network comprising a plurality of nodes, each node in the plurality of nodes maintains at least a predetermined number of tokens, each token representing a value.

The process 900 validates a current state of a public ledger;

The process 900 generates fulfillment information based on the received settlement information.

The process 900 also contributes to an updated state of the public ledger using the fulfillment information; wherein each token is associated with data describing the production, consumption, storage, management and transmission of electricity.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it can be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed:

1. A computer-implemented method for managing electrical energy transactions over a network, the method comprising:
   receiving, by a processor located at a source node of the network, wherein the network comprises at least the source node and a destination node, an indication that the source node has generated a quantity of energy, wherein the source node generates electrical energy and the destination node consumes electrical energy or stores electrical energy, wherein the indication comprises an identifier of the source node and the quantity of generated energy;
   based on the received indication, generating, by the processor, a token representing the quantity of generated energy and representing an energy characteristic of the quantity of generated energy;
   receiving from the destination node, by the processor, a request to transmit a quantity of requested energy to the destination node;
   identifying, by the processor, a location of the destination node and an electrical routing path between the source node and the destination node;
   estimating, by the processor using a loss calculation, an energy loss that the quantity of requested energy is estimated to experience along the identified electrical routing path from the source node to the destination node;
   recording, by the processor, to a public ledger of a blockchain, information of a transaction between the source node and the destination node associated with the transmission of the quantity of requested energy and information relating to the generated token and the estimated energy loss; and
   transmitting, at the source node, the quantity of requested energy from the source node to the destination node based on the generated token and the received request.

2. The computer-implemented method of claim 1, wherein estimating the energy loss comprises estimating energy loss associated with voltage conversion losses experienced along the identified electrical routing path.

3. The computer-implemented method of claim 1, wherein estimating the energy loss comprises estimating energy loss associated with one or more electrical transformers of the identified electrical routing path.

4. The computer-implemented method of claim 1, wherein the indication from the source node comprises information of a physical process that generated the generated energy.

5. The computer-implemented method of claim 1, wherein the energy characteristic of the token comprises information of a physical process related to the generation of the quantity of generated energy.

6. A system for managing electrical energy transactions over a network, the system comprising:
   a processor located at a source node of the network, wherein the network comprises at least the source node and a destination node; and
   a non-transitory computer-readable medium storing instructions thereon which, when executed by the processor, causes the processor to perform operations comprising:
      receiving an indication that the source node has generated a quantity of energy, wherein the source node generates electrical energy and the destination node consumes electrical energy or stores electrical energy, wherein the indication comprises an identifier of the source node and the quantity of generated energy;
      based on the received indication, generating a token representing the quantity of generated energy and representing an energy characteristic of the quantity of generated energy;
      receiving from the destination node, a request to transmit a quantity of requested energy to the destination node;
      identifying a location of the destination node and an electrical routing path between the source node and the destination node;
      estimating using a loss calculation, an energy loss that the quantity of requested energy is estimated to experience along the identified electrical routing path from the source node to the destination node;
      recording to a public ledger of a blockchain, information of a transaction between the source node and the destination node associated with the transmission of the quantity of requested energy and information relating to the generated token and the estimated energy loss; and
      transmitting the quantity of requested energy from the source node to the destination node based on the generated token and the received request.

7. The system of claim 6, wherein estimating the energy loss comprises estimating energy loss associated with voltage conversion losses experienced along the identified electrical routing path.

8. The system of claim 6, wherein estimating the energy loss comprises estimating energy loss associated with one or more electrical transformers of the identified electrical routing path.

9. The system of claim 6, wherein the indication from the source node comprises information of a physical process that generated the generated energy.

10. The system of claim 6, wherein the energy characteristic of the token comprises information of a physical process related to the generation of the quantity of generated energy.

11. A non-transitory computer readable medium storing instructions that, when executed by a processor located at a source node of a network manage electrical energy transactions over the network, wherein the network comprises at least the source node and a destination node, cause the processor to perform operations comprising:
   receiving an indication that the source node has generated a quantity of energy, wherein the source node generates electrical energy and the destination node consumes electrical energy or stores electrical energy, wherein the indication comprises an identifier of the source node and the quantity of generated energy;

based on the received indication, generating a token representing the quantity of generated energy and representing an energy characteristic of the quantity of generated energy;

receiving from the destination node, a request to transmit a quantity of requested energy to the destination node;

identifying a location of the destination node and an electrical routing path between the source node and the destination node;

estimating using a loss calculation, an energy loss that the quantity of requested energy is estimated to experience along the identified electrical routing path from the source node to the destination node;

recording to a public ledger of a blockchain, information of a transaction between the source node and the destination node associated with the transmission of the quantity of requested energy and information relating to the generated token and the estimated energy loss; and transmitting the quantity of requested energy from the source node to the destination node based on the generated token and the received request.

12. The non-transitory computer readable medium of claim 11, wherein estimating the energy loss comprises estimating energy loss associated with voltage conversion losses experienced along the identified electrical routing path.

13. The non-transitory computer readable medium of claim 11, wherein estimating the energy loss comprises estimating energy loss associated with one or more electrical transformers of the identified electrical routing path.

14. The non-transitory computer readable medium of claim 11, wherein the indication from the source node comprises information of a physical process that generated the generated energy.

15. The non-transitory computer readable medium of claim 11, wherein the energy characteristic of the token comprises information of a physical process related to the generation of the quantity of generated energy.

16. The system of claim 6, wherein the token is used for permissioning marketplace participation.

17. The non-transitory computer readable medium of claim 11, wherein the token comprises information relating to the source node.

* * * * *

UNITED STATES PATENT AND TRADEMARK OFFICE
CERTIFICATE OF CORRECTION

| | | |
|---|---|---|
| PATENT NO. | : 11,282,149 B2 | |
| APPLICATION NO. | : 16/103247 | |
| DATED | : March 22, 2022 | |
| INVENTOR(S) | : Lawrence Orsini | |

It is certified that error appears in the above-identified patent and that said Letters Patent is hereby corrected as shown below:

On the Title Page

Column 2 (Item (56) Other Publications): Delete "Inoformal" and insert -- Informal --.

Signed and Sealed this
Thirty-first Day of May, 2022

*Katherine Kelly Vidal*

Katherine Kelly Vidal
*Director of the United States Patent and Trademark Office*